April 2, 1968     A. W. GROTEFELD ET AL     3,375,626
GLAZINGS FOR VEHICLES
Original Filed April 19, 1965
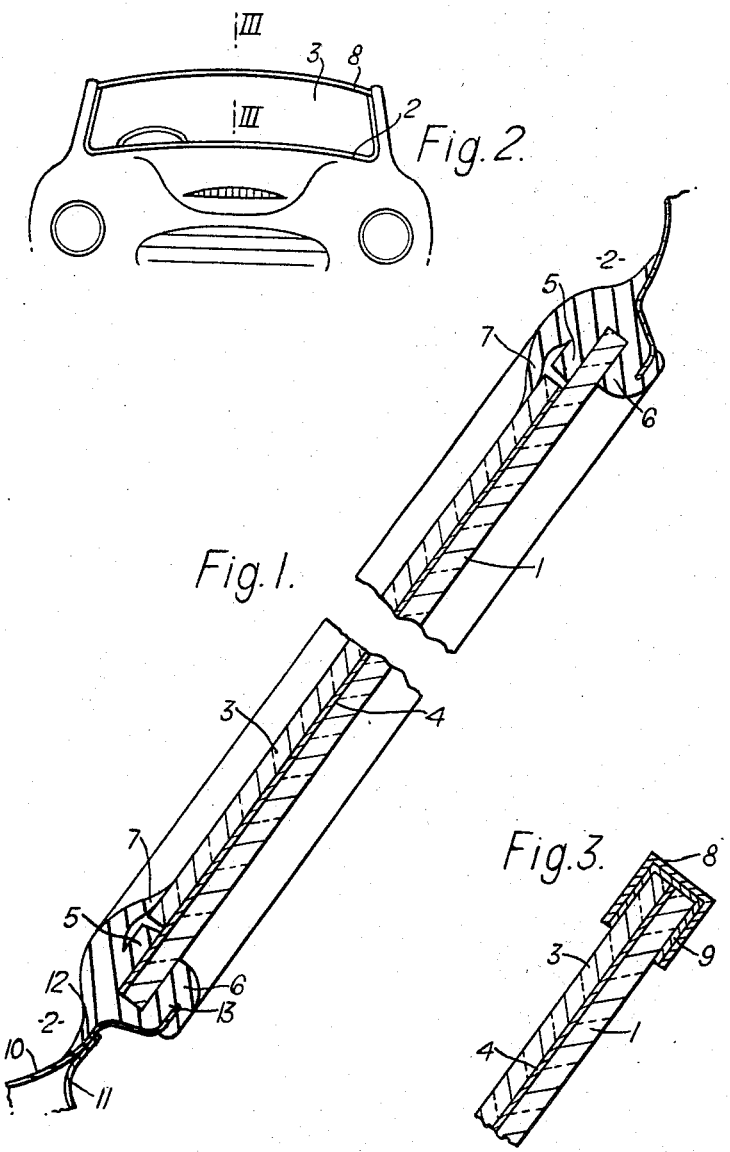
Inventors
AUGUSTUS W. GROTEFELD
BARRIE HEATH
By *Imirie & Smiley*
Attorneys

United States Patent Office 3,375,626
Patented Apr. 2, 1968

3,375,626
GLAZINGS FOR VEHICLES
Augustus William Grotefeld, Wembley, Middlesex, England; Hedwig Grotefeld, executrix of said Augustus William Grotefeld, deceased, and Barrie Heath, London, England, assignors to Triplex Safety Glass Company Limited, London, England, a company of Great Britain
Continuation of application Ser. No. 448,939, Apr. 19, 1965. This application Aug. 1, 1967, Ser. No. 657,710
Claims priority, application Great Britain, Apr. 23, 1964, 16,943/64
10 Claims. (Cl. 52—208)

ABSTRACT OF THE DISCLOSURE

The invention is directed to vehicle glazing panels and particularly to windscreen or windshield glazing. The glazing includes a toughened or tempered glass sheet adapted to be mounted in a frame, and having bonded to its outer surface an untoughened or annealed glass sheet of smaller dimensions than the toughened sheet so that it does not engage within the frame. The bonding layer is coextensive with the untoughened sheet around three edges of the latter but extends beyond the fourth edge for attachment with the toughened sheet within a frame.

---

This is a continuation of application Ser. No. 448,939 filed Apr. 19, 1965.

Background of invention

Windscreens for motorized vehicles at present in use are of two main types each having its specific disadvantage. The two types of glazing panels are those consisting of toughened glass and those consisting of laminated untoughened glass.

The disadvantage of a toughened glass windscreen which may become apparent at any time however careful the driver may be is that should a small flying stone strike the outer surface of the glass with sufficient intensity the windscreen will instantly produce fragmentation or what is known as "dicing" of the windscreen and unless the windscreen is of the type ensuring a relatively coarse dicing in a location covering the line of sight of the driver, the ensuing fragmentation will obscure the driver's vision so that he has no alternative but to stop the vehicle immediately. Sometimes in an emergency it is advisable to push out the fragmented glass to give a sufficient line of sight to enable the driver to bring the car safely to a halt, but numerous small particles of glass may be blown back into the vehicle.

Where laminated untoughened glass panels are installed, impacts of small stones merely result in a local pitting of the windscreen but in the event of a collision in extreme circumstances the driver or passengers in the front seat of a vehicle may be projected head first into the windscreen, and may suffer severe laceration when withdrawn from it especially if the impact has been sufficiently severe to force a portion of the head through the windscreen, since the elasticity of the interlayer will cause the jagged edges of the fractured glass to close tightly on to the head.

Brief summary of invention

A laminated window assembly for glazing vehicles especially a windscreen assembly according to the present invention comprises a supporting framework including parallelly disposed walls in spaced relation defining a channel inwardly directed with respect to the framework, a toughened or tempered glass sheet held within the channel characterized in that an untoughened or ordinary annealed glass sheet is bonded to the outer face of the toughened glass by an intervening bonding layer, the dimensions of the untoughened glass being less than that of the toughened sheet to lie near to the channel wall, which wall overlies the outer face of the toughened glass.

Said supporting framework may be provided with a lip to overlie the periphery of the untoughened sheet.

The overlying lip embracing the edge of the glass will lie over the marginal surface of the untoughened glass and more readily accommodate slight variations in the width of the rebate whilst at the same time protecting the edge of the bonding layer from atmospheric conditions.

A window assembly constructed in accordance with the present invention may comprise a surrounding frame within which a sheet of toughened glass is held, said sheet carrying a sheet of untoughened glass held to it by an intervening bonding layer, and in accordance with the invention the bonding layer may extend over at least part or parts of the marginal area of the toughened sheet of glass, preferably at the lower edge of the assembly, and be received and held by the channel of the supporting structure accommodating the marginal area of the toughened glass; such a construction lessens the likelihood of complete detachment of the assembly from the vehicle when fracture of the toughened glass occurs.

Where the glass is curved or the marginal area in question (e.g. the marginal area along the bottom edge) is not straight the extent of the extension of the bonding layer along the bottom edge is such as to permit the glazing assembly to fall forward as on a hinge. Thereby the likelihood of the glazing being detached is minimised. Conveniently the extension is provided only in the middle portion of the margin of the assembly.

Other means of accommodation and protection, such as a separate overlying strip of material inserted in a subsidiary groove in the supporting structure may readily be devised. Such a separate strip of material will be required when an adhesive is used for securing the glass to the supporting structure.

The present invention comprises a framed assembly in which the supporting framework extends only along the bottom edge of the assembly and up the side edges, and the top edge of the assembly is capped from side to side against weathering effects at the interfaces of the assembly.

Where the supporting framework for a windscreen embraces only the bottom edge and two side edges of the windscreen, e.g. on sports cars, laminated windscreens made according to the present invention have considerable strength and are far less liable than screens of laminated untoughened glass only to crack as a result of flexure in the supporting structure.

Although untoughened glass is employed, the occupants of the car are protected from the potential danger of that glass being splintered because, should they be thrown onto the screen sufficiently violently to cause the sheet of toughened glass to fracture, the marginal portions also will fracture almost instantaneously, the windscreen will no longer be fixed in the surrounding frame and will not be substantially deformed nor will the bonding layer be ruptured as often occurs with a laminated windscreen employing two sheets of untoughened glass.

Moreover, should a person be projected through the aperture of the supporting frame left by the windscreen, only slight lacerations could be caused by the particles of toughened glass retained in the channel fixed to the supporting frame.

The transparent bonding layer between the sheets of glass may support heating means such as a thin electro-conductive metal film on the inner face of one of the glass sheets or fine resistance wires arranged in parallel relation across the screen and embedded in the transparent bonding layer.

In general, windscreen frames are of rectangular form and accordingly the sheets of the laminar assembly constructed in accordance with the present invention will have that geometrical form, whether the windscreen is flat or whether it is curved to present a convex outer surface. Where the windscreen is curved the two sheets of glass will be bent to produce conformity one with the other, the larger sheet being toughened before inclusion in the assembly effected according to the invention.

Where the supporting structure includes only a bottom member and side posts, the top edges of the windscreen may be of arcuate form to give a pleasing profile, having in mind the general design of the vehicle, but whether the top edges are straight or of arcuate form, the top edges of the untoughened and toughened sheets will have at the most a light protecting channel and will then be flush one with the other. The marginal area in the toughened sheet used for fixing the windscreen into position would in this exemplification of the invention extend along the bottom of the windscreen and up the sides for fixing to the lower frame element and the adjoining posts.

The present invention comprises a method of protecting a toughened glass windscreen or the like from dicing due to impact from outside, by covering the toughened glass by untoughened glass from which later, if it be splintered, the passengers are effectively protected by the toughened glass intervening between them and the splinters in the event of them being projected forward by any sudden deceleration. Moreover, if fragmentation of the toughened glass occurs the laminated assembly is releasable from the frame structure whilst if the bonding layer is held in the channel of the frame structure the possibility of uncontrolled detachment of the assembly is hindered.

When the inner sheet of a windscreen according to the invention does fracture, no line of fracture will in general run parallel with the edge of the outer untoughened pane, but the edges of particles there will be orientated at random. Therefore to allow detachment of a fractured screen along the area between the outer pane and the outer wall of the glazing channel it is desirable that few, if any, particles in that area be held firmly both by the bonding layer and by the channel of the supporting structure. Preferably any gap between the outer glass and the outer wall of the channel in the supporting structure will be not less than about half of the average dimension of the particles with which the inner pane fractures. Conveniently the gap will be about ⅛ inch.

In order that the invention may be more clearly understood, reference will now be made to the accompanying diagrammatic drawings which show by way of example the employment of a laminar glazing assembly in accordance with the present invention as a windscreen for motor vehicles.

In the drawings:

FIGURE 1 illustrates, in central vertical section, a windscreen mounted in the channel of a supporting framework surrounding the windscreen;

FIGURE 2 is a front elevation of a sports car type of vehicle in which type the windscreen is set in a channel member extending under and up the sides only of the windscreen; and FIGURE 3 is a section on the line III—III of FIGURE 2, showing a light covering over the flush top edges of the windscreen.

In the drawings like references designate similar parts.

In the construction shown in FIGURE 1, the windscreen comprises a sheet of toughened glass 1 which is mounted in a supporting framework generally indicated at 2, the framework 2 completely surrounding the sheet of toughened glass, and constitutes a channel frame structure.

On to the outer surface of the sheet of toughened glass 1 a sheet of untoughened glass 3 is secured by an intervening bonded layer 4, e.g. of polyvinyl butyral.

Such a laminated sheet of glass, if broken, as by passenger impact, could become detached from the vehicle as a whole and cause damage to persons nearby. If however the bonding material extends into the channel of the supporting frame as now to be described, especially into the bottom straight edge of the frame, e.g. to be coterminous with the corresponding edge of the toughened glass, it will on fracture of that glass be retained in the glazing channel with the fragments of glass and will thereby lessen the likelihood of the whole laminated part of the windscreen from becoming entirely detached from the vehicle.

The channel frame structure 2 of vulcanized rubber, in the construction shown, snugly receives the toughened glass 1 and the bonding layer 4 is extended beyond the profile of the untoughened sheet at the bottom edge thereof to lie within the channel of the supporting framework 2 defined between the outer wall 5 and the inner wall 6 of the framework and the corresponding edge of the untoughened sheet 3 is disposed in juxtaposition with the outer wall 5 of the channel in the supporting framework 2. Thus the assembly is formed with a continuous rebate in its marginal area of which rebate the toughened glass enters the channel of the frame structure and the untoughened glass lies within the configuration of the channel wall 5.

The frame structure may also include a lip 7 which extends in overlapping relation with the channel and is of a width to lap the edge of the untoughened sheet 3 and forms an enclosure over the periphery of the untoughened sheet and with the untoughened sheet affords a complete protection over the outer face of the toughened glass 1.

From the foregoing it will be seen that the toughened glass 1 is entirely protected against the arrival of missiles at the front face concerned, so that the normal ensuring disability from a frontal impact on the toughened glass, i.e. dicing of the toughened glass, is entirely eliminated.

Clearly in a construction according to the invention, if the untoughened sheet 3 is abutted against the wall 5 of the channel, there would be no need to provide the overlying lip 7, so far as protection of the toughened glass is concerned and in such a construction in accordance with the present invention the channel existing between the walls 5 and 6 would hold only the margins of the toughened glass 1 and the channel could be lined with compressible material e.g. felt.

From this aspect the present invention comprises as a component of a windscreen comprising toughened and untoughened glass sheets, the sub-assembly of a toughened glass sheet with a bonding layer of lesser dimensions than the toughened glass so as to leave a marginal area of toughened glass uncovered by the untoughened glass, such marginal area extending along at least three edges of the windscreen, depending on the nature of the supporting structure. The sub-assembly according to the invention may comprise a bonding layer extending beyond an edge of the untoughened sheet, preferably beyond the lower edge of the untoughened sheet so as to be embraced by the channel in the frame structure.

An advantage of extending the bonding layer 4 into the channel will now be mentioned.

If the toughened sheet of glass is broken, as by passenger impact, i.e. from inside the vehicle, it may become detached from the vehicle as a whole and then could cause damage to persons nearby. If, however, the bonding layer 4 extends into the channel of the supporting frame 2, especially into the bottom straight edge of the frame, so as to be co-terminous with the corresponding edge of the toughened glass, it will, on fracture of that glass, be retained in the channel with the local fragments of glass and will thereby lessen the likelihood of the whole laminated part of the windscreen becoming entirely detached from the vehicle.

Where the windscreen is curved or the edge in question (the bottom edge) is not straight, the extend of the described extension of the bonding layer along the bottom edge is such as to permit the glazing assembly to fall forward as on a hinge; accordingly in constructions according to the invention the extension may be provided only in the middle portion of the assembly.

Instead of having a frame which surrounds the windscreen as described with reference to FIGURE 1, the windscreen may be surrounded on three sides only, as indicated in FIGURE 2, which exemplifies the employment of the present invention in respect of a widescreen for sports cars.

The framed windscreen as illustrated in FIGURES 2 and 3 comprises a toughened sheet 1 and an untoughened sheet 3 bonded to the sheet 1 by an interlayer 4 as already described, and preferably the top edges of the untoughened and toughened sheets, which in this construction may be flush, are capped by a light channel member 8 lined with rubber (as indicated at 9) or other compressible material, e.g. felt to form a tight fit over the flush tops of the elements of the windscreen, thereby securing the top edge of the windscreen against weathering effects at the interfaces between the sheets 1 and 3 and the bonding layer 4.

Exactly the same construction at the lower edge and side edges for the windscreen as is illustrated in FIGURE 1 may be adopted for the windscreen shown in FIGURE 2.

For ordinary purposes of glazing windscreens of motor cars the toughened glass sheet would be of the order of 3/16 inch thick, the untoughened glass sheet (sometimes referred to as raw glass) will have a thickness of the order of 3/32 inch, the bonding layer may conveniently be a sheet of polyvinyl butyral having a thickness of the order of 0.015 inch.

As indicated in FIGURE 1 the lower part of the supporting framework 2 may be connected to the scuttle and instrument panel of the vehicle, indicated at 10 and 11 respectively, and welded together at 12, so as to provide an upward extension 13 which is embedded in the supporting framework 2.

From the foregoing description it will be understood that the whole assembly of toughened and untoughened sheets is released from the respective supporting framework by the dicing which extends to the margins of the toughened glass, when a sufficient but unusual force is directed to the inner face of the assembly. At the same time the fragments of the toughened glass are substantially retained by the bonding layer in the assembly which also effectively holds on to any splinters formed in the outer pane of untoughened glass.

A laminar assembly according to the invention retains the advantages of strength in the toughened glass without the risks of damage inherent in the numerous small particles of an unlaminated toughened screen and the advantage of an untoughened laminated glass in its insusceptibility to disintegration by a small flying stone. The assembly also avoids the dangers of a person's head and neck passing into or through a fractured windscreen of untoughened glass by providing for the detachment of the screen before it becomes distorted to such an extent as would give rise to such possibilities.

A laminated assembly constructed as herein described ensures that impact of flying stones will not cause dicing of the toughened glass and consequent loss of vision, because the toughened glass is protected by the outer untoughened sheet, and if the toughened glass should become diced by the heavy impact of a person thrown forwards on to the windscreen, the particles will adhere to the bonding layer and the whole windscreen will be thrown outwards by the impact, so that no particles of the diced glass will be blown back by wind pressure into the vehicle. Furthermore no daggers of untoughened glass can be retained in the supporting framework, but only the relatively harmless particles of diced toughened glass.

Instead of using a polyvinyl butyral material to form the interlayer 4 a self-setting cement may be used, i.e. a cement which polymerises in situ, an example of which is that known as Beetle 4128 or an epoxy resin such as Araldite 103 (CIBA).

Although motor vehicles have been referred to by way of example glazing assemblies according to the present invention may be incorporated in railroad vehicles, and so far as motor vehicles are concerned are of particular use in forming front windows for passengers of motor buses as well as windows for the drivers of such buses.

It will be appreciated from the foregoing that the present invention also comprehends a laminated assembly characterised by an outer surface of untoughened glass and an inward surface of toughened glass, the untoughened and toughened glasses being bonded by an intervening layer, for use in a window assembly according to the invention, wherein the intervening layer corresponds in shape with the untoughened glass, the layer and the untoughened glass being geometrically similar to and smaller than the toughened glass to form a rebate about the untoughened glass which rebate becomes juxtaposed to the supporting frame when the toughened glass is located in the channel. A laminated assembly constructed in accordance with this aspect of the invention may include a single untoughened outer sheet of glass or may include two or more untoughened sheets of glass laminated together and bonded to the outside of the toughened sheet.

We claim:
1. In an automotive vehicle having a body provided with a windshield supporting frame,
    a laminated windshield, said windshield having an inner lamination, an outer lamination and an intervening bonding sheet joining said laminations, the improvement comprising:
        said inner lamination constituting substantially the sole connection of said windshield to said frame and edges of said outer lamination being closely adjacent to but unsupported by said frame,
        said inner lamination being constructed of toughened glass whereby impact of an occupant against said inner lamination will granulate such inner lamination to (a) minimize the presence of sharp edged glass fragments contact with the impacting occupant, and (b) substantially remove the supporting connection between the windshield and said frame whereby the impacting occupant's inertia tends to carry the windshield away from the frame and prevent penetration of the windshield by the impacting occupant due to the presence of said bonding sheet,
        said outer lamination being constructed of untoughened glass and substantially completely covering that portion of the inner lamination exteriorly exposed through said frame whereby reasonable external impact against said windshield is ineffective to granulate said inner lamination and will at most cause local damage to said outer lamination.

2. In an automotive vehicle as defined in claim 1 wherein said frame is in the form of a peripherally extending member having a channel receiving the marginal edge of said inner lamination.

3. In an automotive vehicle as defined in claim 2 wherein said frame includes a resilient deformable lip overlying said outer lamination.

4. In an automotive vehicle as defined in claim 1 wherein said frame is in the form of a peripherally extending member having a channel receiving the marginal edge of said inner lamination, said bonding sheet terminating short of said channel in all but a lower portion of such channel whereat the bonding sheet projects thereinto.

5. In an automotive vehicle as defined in claim 4 wherein said frame includes a resilient deformable lip overlying said outer lamination.

6. In an automotive vehicle as defined in claim 1 wherein said frame includes a member having a channel receiving marginal edge portions of said inner lamination.

7. In an automotive vehicle as defined in claim 6 wherein said frame member includes a resilient deformable lip adjacent said channel overlying marginal edge portions of said outer lamination.

8. In a laminated window assembly for glazing vehicles, comprising a supporting frame having an inwardly opening channel therearound, a first glass sheet mounted in said frame with its corresponding peripheral edge portions seated in said channel, and a second glass sheet laminated to said first glass sheet by an intervening bonding layer, the improvement comprising said first glass sheet being composed of toughened glass, said second glass sheet being composed of untoughened glass and being disposed on the outer side of said first glass sheet, and the dimensions of said second glass sheet being less than those of the channel defining frame portion overlying the outer side of said first glass sheet so that the edges of said second glass sheet are disposed near to the edges of said frame portion, the dimensions of said bonding layer being less than the inner edges of said frame around all but one side thereof but extending beyond at least part of one edge only of said frame into said channel to permit outward swinging of the glass from the frame when said toughened first glass sheet is fractured.

9. In a window glazing according to claim 8, said one edge being the lower edge whereby said glass will swing downwardly.

10. In a window glazing according to claim 8, said frame having a thin resilient deformable lip on its outer side and overlying the periphery of said second sheet to protect the edges thereof and the bonding layer thereunder.

References Cited

UNITED STATES PATENTS

| | | | |
|---|---|---|---|
| 2,205,522 | 6/1940 | Fix | 52—203 |
| 2,401,552 | 6/1946 | Cox | 52—622 |
| 2,784,926 | 3/1957 | Bonza et al. | 52—400 |
| 2,945,268 | 7/1959 | Takenaka et al. | 52—400 |
| 3,009,845 | 11/1961 | Wiser | 52—627 |
| 3,081,205 | 3/1963 | Shorr | 52—622 |

KENNETH DOWNEY, *Primary Examiner*.